(12) United States Patent
Spencer et al.

(10) Patent No.: US 9,563,402 B2
(45) Date of Patent: Feb. 7, 2017

(54) METHOD AND APPARATUS FOR ADDITIVE RANGE REDUCTION

(75) Inventors: Christopher L. Spencer, Oviedo, FL (US); Yun-Xiao Zou, Shanghai (CN); Brian L. Sumner, Sugar Land, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 1163 days.

(21) Appl. No.: 13/223,974

(22) Filed: Sep. 1, 2011

(65) Prior Publication Data
US 2013/0060829 A1    Mar. 7, 2013

(51) Int. Cl.
*G06F 7/548*    (2006.01)
(52) U.S. Cl.
CPC ................................. *G06F 7/548* (2013.01)
(58) Field of Classification Search
None
See application file for complete search history.

(56) References Cited

U.S. PATENT DOCUMENTS

| | | | | |
|---|---|---|---|---|
| 5,235,535 A | * | 8/1993 | Nakayama | G06F 1/0356 708/440 |
| 5,463,574 A | * | 10/1995 | Desrosiers et al. | 708/495 |
| 8,484,265 B1 | * | 7/2013 | Langhammer | 708/201 |

* cited by examiner

*Primary Examiner* — Michael D Yaary
(74) *Attorney, Agent, or Firm* — Volpe and Koenig, P.C.

(57) ABSTRACT

A method and apparatus for additive range reduction are disclosed. A constant may be pre-stored in a look-up table (LUT), and at least one section of the constant may be retrieved from the LUT for generating a product of an input argument and the constant such that a precision of the product may be controlled in any granularity. For a trigonometric function, $2/\pi$ is stored in the LUT, and at least one section of $2/\pi$ may be retrieved from the LUT. The argument is multiplied with the retrieved sections of $2/\pi$. The retrieved sections are determined to correctly generate the two least significant bits (LSBs) of an integer portion and a scalable number of most significant bits of the multiplication result. An output of the trigonometric function is generated for the argument with a fractional portion of the multiplication result based on two LSBs of the integer portion of the multiplication result.

20 Claims, 1 Drawing Sheet

METHOD AND APPARATUS FOR ADDITIVE RANGE REDUCTION

FIELD OF THE INVENTION

This application is related to a processor for additive range reduction. For example, a processor configured to generate an output of a trigonometric function using a trigonometric argument reduction.

BACKGROUND

A certain imprecision exists in an operation performed in a computer due to the characteristics of the hardware used to represent real numbers in the computer. Due to the finite size of memory storage in a computer, non-terminating real numbers are represented with a certain number of significant digits after either truncation or rounding. These numbers are referred to as floating-point numbers. Once the real numbers are represented as floating-point numbers, further imprecision arises because arithmetic operations performed by a computer generally involve further truncation or rounding.

For periodic functions such as trigonometric functions, the large input argument can be reduced in magnitude to a smaller reduced argument that allows more manageable evaluations of the function. The smaller reduced arguments are obtained from identities for periodic functions. For example, the sine and cosine functions satisfy the following relations:

$$\sin(x)=\sin(x+2\pi N), \text{ and} \quad \text{Equation (1)}$$

$$\cos(x)=\cos(x+2\pi N), \quad \text{Equation (2)}$$

where N is an integer.

In evaluation of the trigonometric functions on a computer having a specific machine precision, the performance of argument reductions may be problematic when the argument x is large since the period $2\pi$ is an irrational real number. Since the period is irrational, the argument reduction is, in itself, approximate when performed in a computer. In a computer, only an approximation to $\pi$ may be represented. As the magnitude of the input argument increases, more and more digits of $\pi$, (more commonly $\pi/2$ or $2/\pi$ if the argument x is reduced to a range $$[-\frac{\pi}{4}, \frac{\pi}{4}]),$$

will be involved in the argument reduction, and it may not result in an accurate outcome.

SUMMARY OF EMBODIMENTS

A method and apparatus for additive range reduction in a computer configured to represent non-terminating real numbers are disclosed. For example a processor configured to generate an output of a function such as a trigonometric function with a very large input argument are disclosed. A constant, such as $2/\pi$, may be pre-stored in a look-up table (LUT) in a memory (e.g., a cache memory, a main memory, a register file, or the like), and at least one section of the constant may be retrieved from the LUT for generating a product of an input argument and the constant such that a precision of the product may be controlled in any degree. For a trigonometric function, a predetermined number of bits of $2/\pi$ may be stored in the LUT, and at least one section of $2/\pi$ is retrieved from the LUT. The argument is then multiplied with the retrieved sections of $2/\pi$ in the processor configured for such multiplication. The retrieved sections of $2/\pi$ are determined to correctly generate the two least significant bits (LSBs) of an integer portion in a multiplication result and a scalable number of most significant bits (MSBs) of the multiplication result. An output of the trigonometric function is generated for the argument with a fractional portion of the multiplication result based on the two LSBs of the integer portion of the multiplication result.

BRIEF DESCRIPTION OF THE DRAWINGS

A more detailed understanding may be had from the following description, given by way of example in conjunction with the accompanying drawings wherein.

DETAILED DESCRIPTION

Figure 1:
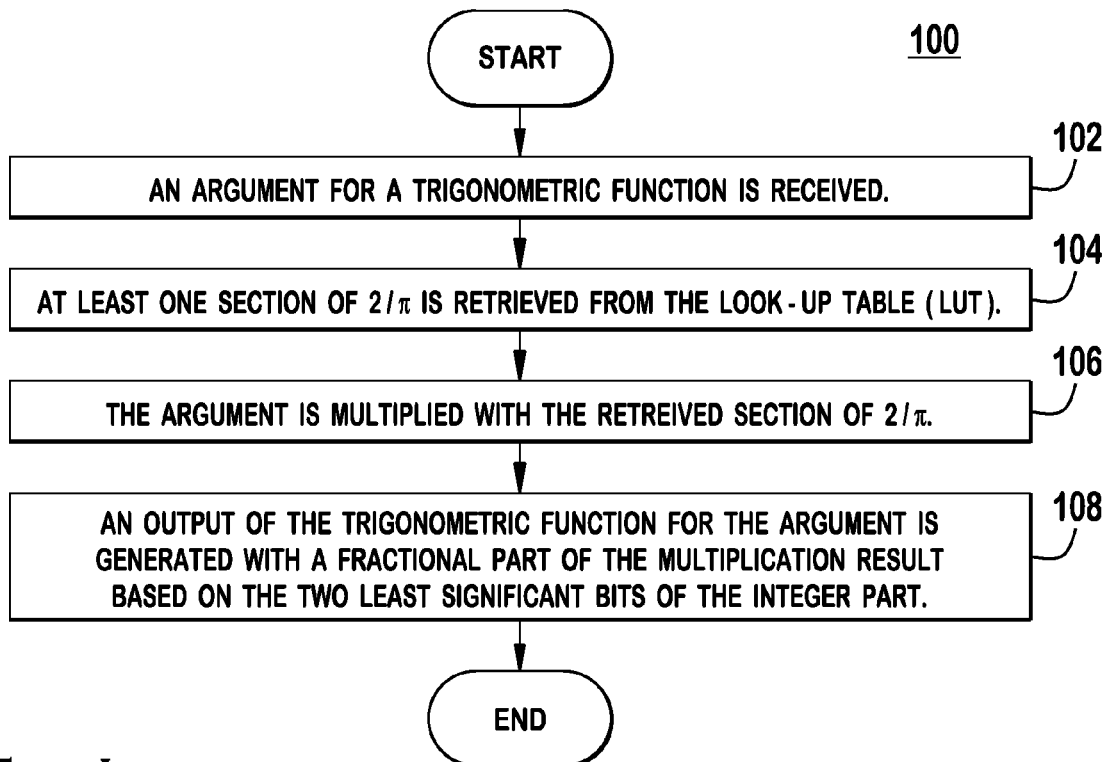
FIG. 1 is a flow diagram of an example process of generating an output of a trigonometric function using a trigonometric argument reduction in one embodiment.

The embodiments will be described with reference to the drawing figures wherein like numerals represent like elements throughout.

Embodiments disclosed herein may be implemented for any type of processor, (e.g., central processing units (CPU), graphics processing units (GPU), accelerated processors, or the like), or any chipset or integrated circuit.

In accordance with one embodiment, a processor is configured for additive range reduction in generation of an output of a function, such as a trigonometric function with a very large input argument. A constant involved in generation of the output of a function may be pre-stored in an LUT in a memory, (e.g., a cache memory, a main memory, a register file, or the like), and a section of the constant is retrieved from the LUT for generating a product of an input argument and the constant such that a precision of the product may be controlled in any degree. The constant may be any transcendental or irrational number (such as $\sqrt{2}$, $\pi$, ln 2, $2/\pi$, etc.), or any number that requires a high precision. The number of bits of the constant stored in the LUT may be any number, (e.g., 1,184 bits).

For example, an input argument X may be written in a floating point format, (such as half, single, double, quad, extended double format, or the like), as follows:

$$x_k \ldots x_1 x_0 b^{e-k},$$

where the binary format $x_k \ldots x_1$ are the significand bits (k=23, 52, 112, or the like), b is the base (2), and e is the unbiased exponent. The input argument may be in any other format.

A constant C may be written as follows:

$$c_1 \ldots c_1 c_0 . c_{-1} c_{-2} \ldots c_{-n}.$$

An instruction accepts X (and optionally an index J (J=0, 1, 2, ...)), and produces a floating point number $Y_J$, which may be written as follows:

$$y_k \ldots y_1 y_0 b^{E-k},$$

where E is an unbiased exponent. $Y_J$ is a section extracted from C stored in the LUT starting from any bit of C and in any length. J controls the number of bits extracted from C. If J=0, the product of X and $Y_0$ contains the m least significant bits of the integer part of the product of X and C, and the k+1−m most significant bits of the fractional part of the product of X and C. If J is not '0', additional bits are extracted from C depending on the value of J, (e.g., if J=1, the next k+1 bits are extracted from C, and if J=2, the subsequent k+1 bits are extracted from C, and so on). k+1 bits of $Y_J$ may be extracted from C with a least significant bit $c_{-(e-m-1)-J(k+1)}$ and E may be set to -(e-m-1)-J(k+1).

The above embodiment may be employed for a trigonometric argument reduction, which will be explained in detail hereafter. In trigonometric function calculation, C=2/π (with l=-1), and m=2.

In computing trigonometric functions, (such as sin(x), cos(x), or tan(x)), the argument x may be reduced to r in a range $$[-\frac{\pi}{4}, \frac{\pi}{4}].$$

The argument x may be represented as follows:

$$x = k(\pi/2) + r,\qquad \text{Equation (3)}$$

where k is an integer, and |r|≤π/4. The computation of trigonometric functions cos(x) and sin(x) may then be replaced by the computation of the trigonometric functions sin(r) or cos(r) in the range $$[-\frac{\pi}{4}, \frac{\pi}{4}]$$

as follows:

$$\cos(x)=\cos(r), \text{ and } \sin(x)=\sin(r), \text{ if } (k \bmod 4)=0; \qquad \text{Equation (4)}$$

$$\cos(x)=-\sin(r), \text{ and } \sin(x)=\cos(r), \text{ if } (k \bmod 4)=1; \qquad \text{Equation (5)}$$

$$\cos(x)=-\cos(r), \text{ and } \sin(x)=-\sin(r), \text{ if } (k \bmod 4)=2; \text{ and} \qquad \text{Equation (6)}$$

$$\cos(x)=\sin(r), \text{ and } \sin(x)=-\cos(r), \text{ if } (k \bmod 4)=3. \qquad \text{Equation (7)}$$

By multiplying 2/π to equation (3), the following is obtained:

$$x(2/\pi)=k+r(2/\pi). \qquad \text{Equation (8)}$$

k is an integer part of x(2/π), and r(2/π) is a fractional part of x(2/π) since |r|≤π/4. One of the equations (4)-(7) is selected based on the integer part of x(2/π), (i.e., k), and the reduced argument value r may be obtained by multiplying (π/2) to the fractional part of x(2/π). The trigonometric function of the argument is then generated with the reduced argument r.

For extremely large values of x, it is required to multiply x with a large number of bits of (2/π) in order to obtain r to the required precision. This operation may take lots of instructions without acceleration. In one embodiment, a sufficient number of bits of (2/π), (e.g., 1184 bits), may be stored in the LUT and the input angle value x may be multiplied by a section of (2/π) that is retrieved to generate at least two least significant bits (LSBs) of the integer part of the multiplication result (x(2/π)) since only the two LSBs of the integer part of the multiplication result (x(2/π)), (i.e., k mod 4), is needed to select one of the equations (4)-(7).

The value of (2/π) may be stored in segments in a hardware LUT. Where the LUT hardware supplies a limited number of bits of (2/π) at a time, the instruction may be called iteratively to retrieve enough number of bits from the LUT for the required precision depending on the index (J).

The embodiment above may be implemented with a new opcode. The new opcode may inspect the input angle value x, (e.g., an exponent of the input angle value), and an index (J), and retrieve a section of (2/π) from the LUT. The result of the operation is the segment of (2/π) needed to perform the argument reduction.

FIG. 1 is a flow diagram of an example process 100 of generating an output of a trigonometric function using a trigonometric argument reduction in one embodiment. An argument for a trigonometric function is received (102). The argument may be in a floating point format, (e.g., half, single, double, quad, extended double, or the like). A predetermined number of bits of (2/π) are stored in a LUT. At least one section of (2/π) is retrieved from the LUT (104). The retrieved section(s) may be in a double precision IEEE binary format, or in any other formats. The argument is multiplied with the retrieved sections of (2/π) (106). The retrieved sections of (2/π) are selected to guarantee at least two correct LSBs of the integer portion in a multiplication result. An output of the trigonometric function for the argument is generated with a fractional part of the multiplication result based on the two LSBs of the integer part, (i.e., selecting one of equations (4)-(7) based on the two LSBs of the integer part) (108).

Figure 2:
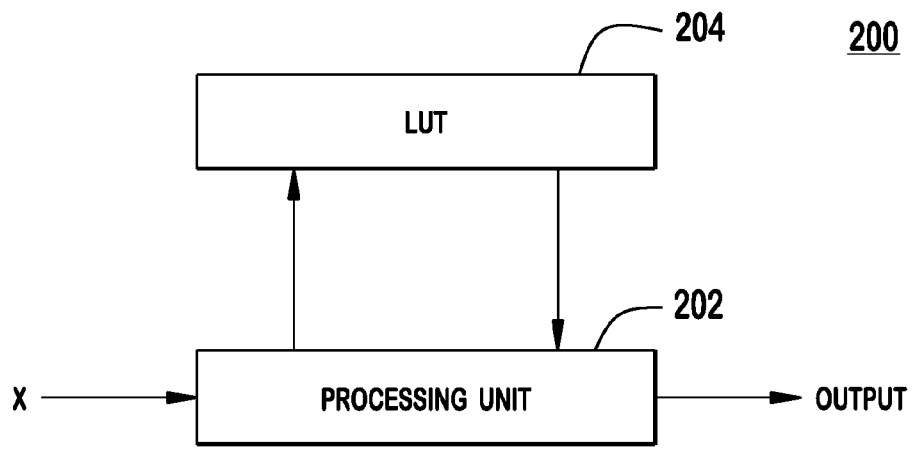
FIG. 2 is a block diagram of an example apparatus for generating an output a function in accordance with one embodiment.

FIG. 2 is a block diagram of an example apparatus 200 for generating an output of a function in accordance with one embodiment. The apparatus 200 includes a processing unit 202 and an LUT 204. The apparatus 200 may be included in a computer where the processing unit 202 may be a CPU, a GPU, an application specific integrated circuits (ASIC) chip, or any type of processing component. The LUT 204 may be in any type of memory, e.g., a cache memory, a main memory, a register file, or the like. The processing unit 202 and the LUT 204 (i.e., the memory) may be on the same component. The processing unit 202 is configured to represent non-terminating real numbers. The LUT 204 stores a predetermined number of bits of a high precision constant (e.g., a transcendental or irrational number). The bits of the constant may be stored in segments in the LUT 204, (e.g., 53 bits each segment). The processing unit 202 is configured to retrieve a section of the constant from the LUT 204. The section of the constant is retrieved such that a product of the argument and the section of the constant includes a first predetermined number of integer portion and a second predetermined number of fractional portion of the product of the argument and the constant. The processing unit 202 is configured to generate an output of the function based on multiplication of the argument and the retrieved section of the constant.

For the trigonometric function, the processing unit 202 is configured to retrieve one or more segment(s) of 2/π from the LUT 204 based on the index. The retrieved segment(s) of 2/π is enough to generate at least two least significant bits (LSBs) of an integer portion in a multiplication result and the number of retrieved 2/π bits are enough for the required precision. Multiple segments of 2/π may be iteratively retrieved from the LUT for the required precision based on the index (J). The processing unit 202 multiplies the argument with the retrieved section of 2/π from the LUT 204. The processing unit 202 then generates an output of the trigonometric function for the argument with a fractional portion of the multiplication result based on the two LSBs of the integer portion of the multiplication result.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method implemented in a processor for generating an output of a function, the method comprising:
    a processor receiving an argument of a function;
    the processor retrieving a section of a constant from a look-up table (LUT) in a memory, wherein the section of the constant is retrieved such that a product of the argument and the section of the constant generates at least two least significant bits (LSBs) of an integer portion of the product and a scalable number of most significant bits (MSBs) of the product; and
    the processor generating an output of the function based on multiplication of the argument and the retrieved section of the constant.

2. The method of claim 1 wherein the function is a trigonometric function, and the constant is $2/\pi$.

3. The method of claim 1 wherein a predetermined equation is selected based on the at least two least significant bits.

4. The method of claim 3 further comprising:
    the processor generating an output of the trigonometric function for the argument with a fractional portion of the product of the argument and the section of the constant based on the at least two least significant bits (LSBs) of the integer portions of the product of the argument and the section of the constant.

5. The method of claim 2 wherein the LUT stores 1184 bits of $2/\pi$.

6. The method of claim 2 wherein bits of $2/\pi$ are stored in the LUT in segments and at least one segment of $2/\pi$ is retrieved from the LUT based on a required precision.

7. The method of claim 1 wherein the argument is in a floating point format.

8. The method of claim 1 wherein the constant is stored in the LUT in segments.

9. The method of claim 8 wherein multiple segments of the constant are retrieved from the LUT iteratively based on a required precision.

10. An apparatus for generating an output of a function, the apparatus comprising:
    a memory for storing a look-up table (LUT) for storing a constant; and
    a processing unit configured to retrieve a section of the constant from the LUT such that a product of an argument for a function and the section of the constant includes at least two least significant bits (LSBs) of an integer portion of the product from which a predetermined equation for a fractional portion is selected based on the at least two least significant bits, and generate an output of the function based on multiplication of the argument and the retrieved section of the constant.

11. The apparatus of claim 10 wherein the function is a trigonometric function, and the constant is $2/\pi$.

12. The apparatus of claim 11 wherein the section of the constant is retrieved such that a product of the argument and the section of the constant generates a scalable number of most significant bits (MSBs).

13. The apparatus of claim 10 wherein the processing unit is configured to generate an output of the trigonometric function for the argument with a fractional portion of the product of the argument and the section of the constant based on the at two least significant bits (LSBs) of the integer portions of the product of the argument and the section of the constant.

14. The apparatus of claim 11 wherein the LUT stores 1184 bits of $2/\pi$.

15. The apparatus of claim 11 wherein bits of $2/\pi$ are stored in the LUT in segments and at least one segment of $2/\pi$ is retrieved from the LUT based on a required precision.

16. The apparatus of claim 10 wherein the argument is in a floating point format.

17. The apparatus of claim 10 wherein the constant is stored in the LUT in segments.

18. The apparatus of claim 17 wherein multiple segments of the constant are retrieved from the LUT iteratively based on a required precision.

19. A non-transitory computer-readable storage medium storing a code for describing a structure and/or a behavior of a circuit configured to retrieve a section of a constant from a look-up table (LUT) such that a product of the argument and the section of the constant generates at least two least significant bits (LSBs) of an integer portion of the product and a scalable number of most significant bits (MSBs) of the product, wherein a predetermined equation is selected based on the at least two least significant bits.

20. The non-transitory computer-readable storage medium of claim 19 wherein the code is written in hardware description language (HDL).

* * * * *